United States Patent [19]
Hogan

[11] 3,914,699
[45] Oct. 21, 1975

[54] PROCESS CONTROLLER HAVING ELECTRONIC MANUAL CONTROL

[75] Inventor: James A. Hogan, Hatfield, Pa.
[73] Assignee: Honeywell Inc., Minneapolis, Minn.
[22] Filed: Dec. 13, 1973
[21] Appl. No.: 424,620

Related U.S. Application Data
[62] Division of Ser. No. 305,068, Nov. 9, 1972.

[52] U.S. Cl. .................. 328/127; 328/1; 328/128
[51] Int. Cl.² ........................................ H03B 1/04
[58] Field of Search ........ 328/1, 127, 128; 330/1 A, 330/10

[56] References Cited
UNITED STATES PATENTS
3,290,563 12/1966 Hyer et al. .................. 330/1 A
3,377,548 4/1968 Newbold ..................... 330/1 A
3,662,275 5/1972 Riley .............................. 328/1

*Primary Examiner*—Michael J. Lynch
*Assistant Examiner*—B. P. Davis
*Attorney, Agent, or Firm*—Arthur H. Swanson; Lockwood D. Burton

[57] ABSTRACT

Circuitry operating from a uni-polar power supply having an error amplifier and a controller amplifier is arranged to modify process variable signal and a set point signal and produce an output signal which is applied to a load element for controlling a process. The error amplifier applies the process variable signal and the difference between the process variable signal and the set point signal to the controller amplifier. A manually operated signal generator selectively provides a control signal for effecting a predetermined variation in the output signal.

3 Claims, 3 Drawing Figures

PROCESS CONTROLLER HAVING ELECTRONIC MANUAL CONTROL

This is a division of application Ser. No. 305,068, filed Nov. 9, 1972.

The present invention relates generally to process controllers, and more particularly to a process controller having an electronic manual control circuit. Prior art process controllers, such as shown in U.S. Pat. No. 3,530,389, receive a signal from a sensor monitoring a process, compare that signal against a received set point signal for establishing an error signal, and provide a characterized output signal for controlling a load element and, in turn, the process. The signal from the automatic sensor, referred to herein as a process variable signal, may represent various process components as for example: pressure, flow rate, temperature, thickness, or any other physical, electrical, or chemical condition. The process variable and set point signals are utilized by the process controller for providing an output signal which automatically adjusts a load element, such as a pump or valve, for returning the monitored process variable to its desired set point. The prior art process controllers utilize three functions for characterizing the output signal and maintaining the process at its set point. The first function is proportional control, or proportional band, which may be considered as a function of the ratio of full-scale swing of the output signal, and in turn the load element, to the deviation of the process variable signal from the set point signal.

In single function controllers, utilizing only the proportional band function, the error signal is never fully eliminated as it is virtually impossible to reduce to zero the deviation between the process variable signal and the set point signal. This error condition is called "droop" and may be reduced to some extent through the use of a high gain amplifier. In many single mode controllers however, the high gain amplifier produces instability; and, therefore, integral control, or reset action, in introduced to minimize the amount of droop and allow the use of an amplifier having a higher gain than otherwise possible. The integral control operates after proportional control for establishing a characterized output signal which slowly returns the load element to the desired set point position. The integral control, or reset action, may be considered as a characterization of the output signal in accordance with the time integral of the error signal. The greater the deviation of the process variable from the set point, the greater will be the speed by which the reset action proportionally adjusts the final control element for returning the process variable to its set point.

In a situation where the deviation of the process variable from its set point is a rapid one, the utilization of the proportional band and reset action alone will not produce an output signal which is sufficient to rapidly adjust the load element. To overcome this problem a third function derivative control or rate action, is introduced into the control circuitry of the process controller. The rate action may be considered as a means for producing an output signal which is a function of the rate of change of the error signal. It compares the rate at which the process variable changes from its set point and momentarily delays the passage of a feedback signal to the controller amplifier for permitting the controller to produce a characterized output signal of proportional magnitude to the rate of change to rapidly shift in the position of the load element.

Process controllers are generally available which have two basic modes of operation, automatic and manual. An example of such a process controller is shown in U.S. Pat. No. 3,443,235. In the automatic mode, the value of a sensed variable automatically adjusts, for example, the position of a controlled member in order to maintain the controlled variable at the set point value. The manual mode permits manual manipulation of the controlled member by allowing an operator to insert a manually controlled signal into the system. In switching from the automatic mode to the manual mode and vice versa, it is essential that the process control signal, which controls the position of the controlled member, does not exhibit a sudden change or "bump" since such a change would cause an undesired fluctuation in the controlled process. When the process controller is switched for example, from automatic to manual operation, the controller must continue to produce an output signal in the manual mode equaling the signal last produced in the automatic mode. That effect is achieved through the use of a memory capacitor circuit which stores a charge proportional to the signal last produced by the controller. When the controller is switched to the manual mode, the charged capacitor retains the controller output signal at its previous level thereby insuring a so-called "bumpless switching" between modes. Adjustment of the controller output signal in the manual mode is accomplished by superimposing a variable potential on the memory signal stored by the memory capacitor through the utilization of a signal generator which employs a manually operated electrical switch. An example of such an electrical switch is shown in U.S. Pat. No. 3,428,887. As shown in the last mentioned patent, a signal of selectively variable potential is provided through the manipulation of a thumbwheel switch. While the manually operated control signal generating device has been generally satisfactory, there still exists a need for a process controller having an electronic control signal generator which has fewer moving parts thereby reducing the friction, wear, and unreliability, inherent in all mechanical devices, vis-a-vis electronic devices.

It is accordingly an object of the present invention to provide an improved process controller having a signal generator which fulfills the foregoing need.

It is a further object of the present invention to provide a process controller with a signal generator which includes a minimal number of moving parts.

It is another object of the present invention to provide a process controller with a signal generator which yields an output signal having a non-linear response characteristic.

It is still another object of the present invention to provide a process controller having a substantially electronic signal generator.

It is still yet another object of the present invention to provide a process controller with an electronic signal generator which is capable of raising or lowering the potential of a point within an electrical circuit when actuated, and which has no effect on that circuit when the actuating force is removed.

It is still a further object of the present invention to provide a process controller with an electronic signal generator which is capable of producing an electrical signal for varying the speed of a controlled member of a utilization device in proportion to a continuous amount of time during which a switching device is closed.

In accomplishing these and other objects, there has been provided, in accordance with the present invention, a process controller having a manually controlled signal generating circuit which is selectively operable to provide a control signal for regulating the movement of a controlled member. The rate of change of the control signal magnitude is directly related to the elapsed uninterrupted time during which a selectively operable switching member is engaged.

A better understanding of the present invention may be had when read in connection with the accompanying drawings in which.

Figure 1:
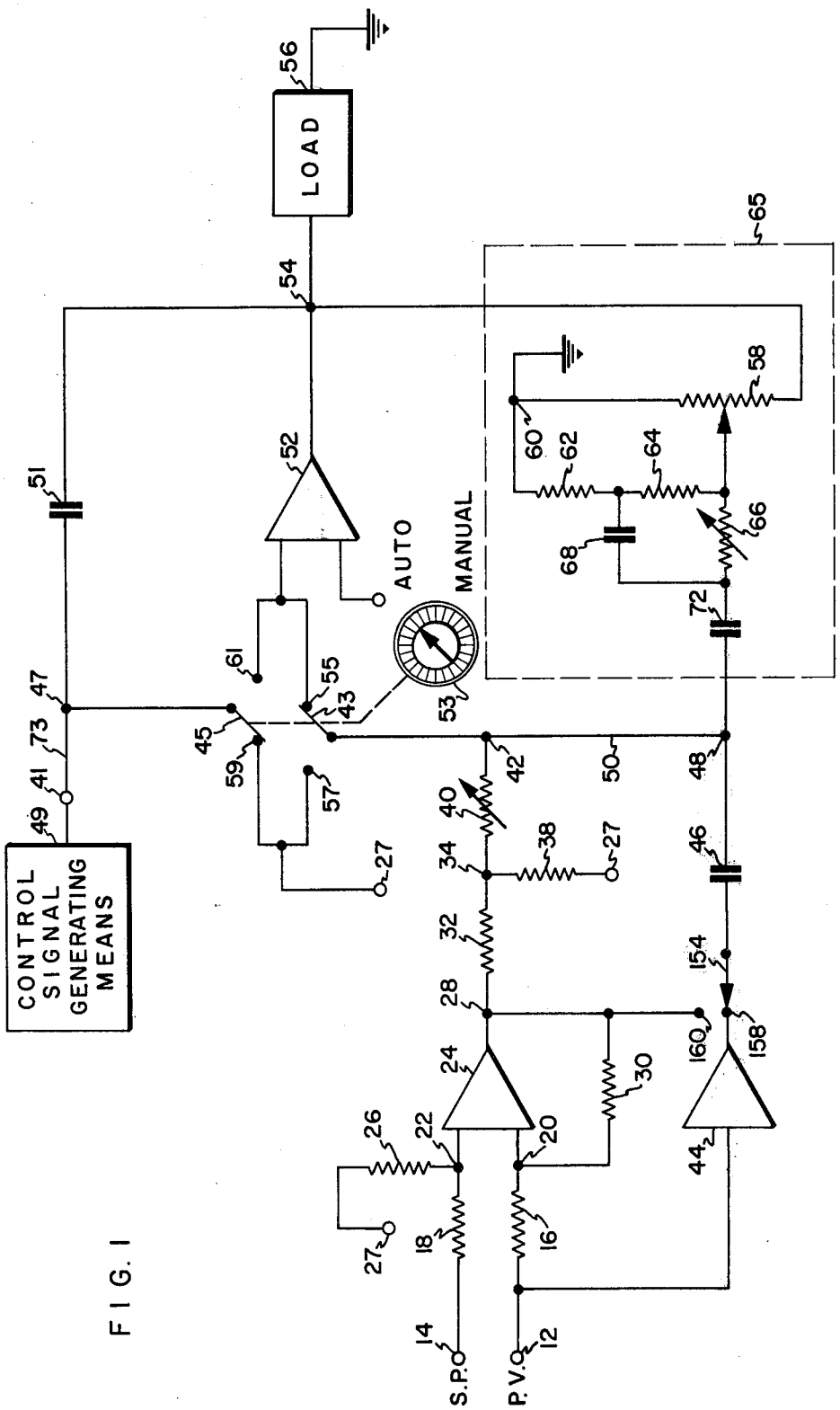
FIG. 1 is a schematic diagram of a process controller embodying the present invention.

Referring in detail to the drawings, FIG. 1 shows an electronic process controller having a pair of input terminals 12 and 14 which are connected through input resistors 16 and 18, respectively, to input terminals 20 and 22 of a differential summing amplifier 24. The input terminal 22 of the differential summing amplifier, 24 is connected through a biasing resistor 26 to a point of fixed potential 27. The output of the differential summing amplifier 24 is connected to an output terminal 28 which is, in turn, connected through a feedback resistor 30 to the input terminal 20 thereof. The output terminal 28 is also connected through a resistor 32 to a first summing junction 34. The first summing junction 34 is connected through a biasing resistor 38 to the point of fixed potential 27 and through an adjustable reset resistor 40 to a second summing junction 42. The amplifier 24 with its associated circuitry comprises an input amplifier means.

In the present invention, the input terminal 12 receives a process variable signal from a process sensor which represents a measured feature of the controlled process. This signal may vary within any given range; however, in the present invention, the process variable signal varies between 1 and 5 volts. The set point signal, received by the input terminal 4, determines the level to which the process is controlled and may be provided by any suitable means, such as an adjustable source of reference potential. In the present invention the set point signal also varies between 1 and 5 volts. The process variable signal and set point signal are applied through input resistors 16 and 18, respectively, to the input terminals 20 and 22 of the differential summing amplifier. The output signal of the amplifier 24 represents an error signal. When the process variable and set point signal are equal, the output of the differential amplifier 24 is equal to the value of the point of fixed potential 27. In the present invention, the value of the fixed potential 27 may be 3 volts. This value has been chosen as it provides a convenient center for a full scale of 1 to 5 volts. When the process variable and set point signals become unequal, for example the process variable increases, the differential summing amplifier 24 produces an output which is applied to the first summing junction 34 and also the second summing junction 42 through the reset resistor 40. The increased process variable signal is also applied through a single stage process variable amplifier 44 to a terminal 158. The amplifier 44 also comprises an input amplifier, i.e. a second input amplifier. Another terminal 160 is connected to the output terminal 28 of the differential amplifier 24. A switching member is selectively operable to connect one of the two terminals 158 and 160, to a first terminal of an input capacitor 46.

The second terminal of the capacitor 46 is connected to a node 48 which is retained at the same potential as the second summing junction 42 by a common connection 50. When the switching member 154 is engaging the terminal 158, a change in the process variable signal is applied directly through the capacitor 46 to the second summing junction 42 and also through the differential summing amplifier 24 thereto.

The second summing junction 42 is connected to a first mode switching member 43 of a double-pole double-throw mode switching means. A second mode switching member 45 of the double-pole double-throw switch or mode switching means, is connected to a common point 47. The common point 47 connects an output terminal 41 of a control signal generating means 49 to a first terminal of a capacitor or storage means 51. The mode switching members 43 and 45 are ganged for simultaneous operation by a switch 53 between terminals 55 and 57, and 59 and 61, respectively. Terminals 57 and 59 are connected together and to the common terminal 27; terminals 55 and 61 are connected together and to one input of a high gain, high impedance controller amplifier 52. The amplifier 52 with its associated circuitry comprises an output amplifier means. The other input of the amplifier 52 is connected to the common terminal 27. An output terminal 54 of the amplifier 52 is connected to the second terminal of the capacitor 51. The capacitor 51 thus comprises a first feedback means around the output amplifier 52. When the switch 53 is set to the AUTO mode, the first mode switching member 43 is connected to the terminal 55, and the second mode switching member 45 is connected to the terminal 59, as shown. When the switch 53 is turned to the MANUAL position, the first and second mode switching members 43 and 45 engage the terminals 57 and 61, respectively.

Impedance means are provided between the output terminal 54 of the high impedance amplifier 52 and the input thereof, as represented by the junction 42, for forming second feedback means on network 65. In this manner the high impedance amplifier 52 is connected in an operational amplifier configuration and the second summing junction 42 becomes a current summing junction. The output terminal 54 of the high impedance amplifier 52 is also connected to a load element 56 which, in turn, is connected to a point of fixed potential, such as ground.

The impedance means within the feedback means 65 of the high impedance controller amplifier 52 includes an adjustable proportional band potentiometer 58 having one terminal of its slidewire connected to the output terminal 54 and the second terminal thereof connected through a junction point 60 to a point of fixed potential, such as ground. Voltage dividing resistors 62 and 64 are series connected between the junction point 60 and the slide arm of the potentiometer 58. The slide-arm of the potentiometer 58 also is connected to a variable rate resistor 66. The other terminal of the variable rate resistor 66 is connected through a reset capacitor 72 to the node 48. A rate capacitor 68 has one terminal connected to the junction 70 between the resistors 62 and 64. The other terminal of the rate capacitor 68 is connected to the junction of the variable rate resistor 66 and the reset capacitor 72.

The reset capacitor 72 combines with the input capacitor 46 for forming a voltage dividing arrangement. The voltage division established by the capacitors 46 and 72 establishes the fundamental gain of the amplifier 52 as a function of the ratio of the capacitances-this, in turn, establishes the primary Proportional Band (P.B.). The adjustment of the P.B. pot 58 effects an adjustment of the P.B. within the range established by the ratio of the input capacitor 46 and the feedback or reset capacitor 72. The reset action is a function of the time constant of the capacitor 72 and the resistors 40 and 38 as well as the high input impedance of the amplifier 52. A more detailed shownning of the amplifiers shown in FIG. 1 may be found in U.S. Pat. No. 3,530,389 which issued to J. Gormley et al. on Sept. 22, 1970, and which is incorporated herein by reference.

The input terminal 12 receives a process variable signal (P.V.) from a process sensor. The process variable signal represents a measured feature of the controlled process. The P.V. signal may vary within any given range; however, in the present example, the P.V. signal varies between 1 and 5 volts. The set point signal (S.P.), received by the input terminal 14, determines the level to which the process is controlled and may be provided by any suitable means, such as an adjustable source of reference potential. In the present example, the S.P. signal also varies between 1 and 5 volts. The P.V. signal and the S.P. signal are applied through input resistors 16 and 18, respectively, to the input terminals 20 and 22 of the differential summing amplifier 24.

The circuit shown in FIG. 1, when used in the automatic mode, provides for a process controller having a direct controlling configuration, i.e. an increase in the process variable signal causes an increase in the load current. It should be noted, however, that by moving the switching member 154 into engagement with the terminal 160, and by changing the position of a reversing switch (now shown) associated with the input of the amplifier 24, a reverse acting controller is provided, i.e. an increase in the process variable signal will effect a decrease in the load current. The specific circuitry involved and the intricacies of the operation thereof are fully explicated in the hereinbefore referenced U.S. Pat. No. 3,530,389, the details of which are not necessary to an understanding of the present invention and are therefore omitted for the sake of simplicity.

Figure 2:
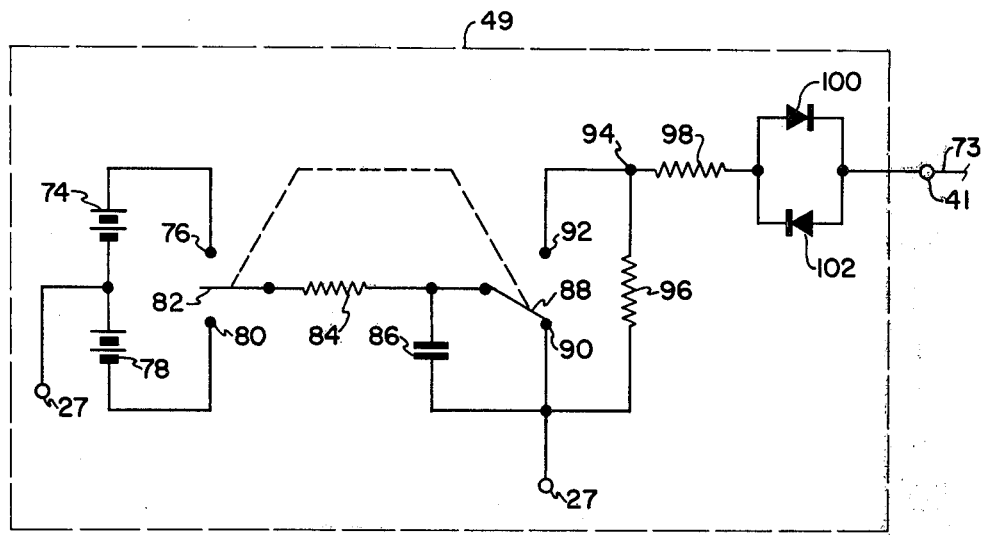
FIG. 2 is a schematic diagram of one embodiment of the signal generator shown in FIG. 1.

Thus far, only the automatic operation of the process controller shown in FIG. 1 has been considered. The manual mode of operation thereof will now be explained in connection with FIGS. 2 and 3. FIG. 2 shows one embodiment of the control signal generating means 49 of FIG. 1. A first battery or D.C. energy source 74 has its negative terminal connected to the common or reference terminal 27 and its positive terminal connected to a source terminal 76. A second D.C. energy source or battery 78 has its positive terminal connected to the common terminal 27 and its negative terminal connected to another source terminal 80. A movable first control switching member 82 is shown in its spring biased unconnected neutral position between source terminals 76 and 80. The first control switching member 82 is connected through a resistor 84 to one terminal of a capacitor 86. The other terminal of the capacitor 86 is connected to the common terminal 27. The circuitry associated with the capacitor 86 and resistor 84 comprises an RC charging circuit. The junction between the resistor 84 and the capacitor 86 is connected to a second control switching member 88 which is normally contacting a switching terminal 90. The control switching members 82 and 88 comprise a control switching means. Control switching members 82 and 88 are so ganged together that a movement of the first control switching member 82 into engagement with either of the source terminals 76 or 80 will cause a corresponding movement of the second control switching member 88 into engagement with a terminal 92. The switching terminal 90 is connected to the common terminal 27 and the switching terminal 92 is connected to a junction point 94. The point 94 is connected through a resistor 96 to the common terminal 27. A resistor 98 connects the point 94 to the anode terminal of a diode 100, the cathode terminal of which is connected by a lead 73 to the point 47 shown in FIG. 1. Another diode 102 is connected across the diode 100, the cathode terminal of the diode 102 being connected to the anode terminal of the diode 100.

In utilizing the manual mode of operation, an operator may want to adjust, only slightly, the position of the controlled member, he may want to change it radically, or to shut down the system completely. The manual mode may also be used for adjusting the controlled member, as represented by the load 56, during pre-startup system check out, or during periodic preventive maintainence checks. Therefore, a signal generator, to be effectively used in conjunction with a manual operation of the operation of the process controller, must provide a signal which is capable of effecting gradual changes when an operator is making fine adjustment. At the same time, however, the generated signal must be capable of moving the controlled member full scale within a predetermined amount of time. The latter requirement is necessary since, in an emergency condition, an operator may be required to manually close or open the controlled member, for example a valve, in as short time as possible. In the past, the mechanical switching device of the general type described in U.S. Pat. No. 3,428,887 has been used to accomplish that purpose. The present invention replaces that mechanical signal generator with one that is substantially electronic in nature. Since the rate of change associated with the manual "fine adjustment" may not be sufficient to run the controlled member full scale within the predetermined period of time, a manually operated signal generator is provided which has a non-linear response characteristic.

To selectively adjust the position of the controlled member, an operator would move the mode switch 53 (FIG. 1) to the "Manual" position. The first mode switching member 43 would then engage the terminal 57 thereby opening the automatic feedback circuit, which includes the second feedback means 65, around the high impedance amplifier 52. Since the terminal 57 is connected to the reference terminal 27, the switching of the member 43 into engagement with the terminal 57 allows the capacitor 72 to track the output signal during the manual mode thereby insuring a subsequent "bumpless switching" back to the automatic mode. The second mode switching member 45 would then engage the terminal 61, thereby providing a connection from the manual control signal generator 49 to the input of the high impedance amplifier 52. With the first mode switching member 43 connected to the terminal 57, the error signal, if any, generated by the amplifier 24 will not be applied to the amplifier 52 and will therefore not affect the control signal applied to the controlled member or load 56. The capacitor 51 will retain a value representative of the value of the output signal generated by the amplifier 52 immediately before the controller was switched into the manual mode. If it is desired to decrease the magnitude of the output signal at the point 54, the first control switching member 82 is moved into engagement with the source terminal 76. That movement will effect a corresponding movement of the ganged second control switching member 88 into engagement with the switching terminal 92. The capacitor 86 will then begin to charge through the resistor 84. The potential change thus occurring across the capacitor 86 represents a manually generated control signal which takes the form of an RC curve according to the value of the resistor 84 and the capacitor 86. That control signal is applied through the second control switching member 88, the resistor 98, the diode 100, and the second mode switching member 45 (FIG. 1), to the high input impedance controller amplifier 52. The arrangement of the capacitor 51 and the high impedance amplifier 52 provides a circuit which responds to the manually generated control signal to algebraically add the time integrated control signal to the output signal at the terminal 54. Therefore, while the operator holds the first control switching member 82 into engagement with the source terminal 76, the output signal appearing at the terminal 54 will increase from the value stored by the capacitor 51 when the process controller was switched into the manual mode. The rate of increase of the output signal is a function of the uninterrupted length of time during which the first and second control switching members 82 and 88 are contacting terminals 76 and 92 respectively. As the uninterrupted time of engagement increases, the rate of change of the output signal will also increase. If the first control switching member 82 is contacting the source terminal 80 and the second control switching member 88 is contacting the terminal 92, the capacitor 86 will charge in the opposite direction toward the potential at the terminal 80, and the magnitude of the output signal at the terminal 54 will increase at an increasing rate. When the operator releases the first control switching member 82, the member 82 will return to its neutral position and the ganged member 88 will return to its normal position contacting the terminal 90 and rapidly discharge the capacitor 86. Therefore, for minor adjustments, an operator may effectively "jog" the controlled member or load 56 using the first control switching member 82 and yet the operator is still able to run the controlled member or load through its entire range of movement within a predetermined relatively short period of time by maintaining the contact between the first control switching member 82 and either of the source terminals 76 or 80. As hereinbefore mentioned, the capacitor 72 will track the changing output signal, thereby allowing a subsequent bumpless transfer from the manual mode to the automatic mode. The parallel combination of the diode 100 and the diode 102 functions to substantially preclude leakage currents from affecting the signal stored by the capacitor 51, thereby increasing the overall accuracy of the system. Although leakage currents are generally of a very small value, they will affect the signal stored by the capacitor 51 over a period of time. The diodes effectively preclude the flowing of leakage currents of a value which is insufficient by itself to render the diodes conductive. However, the control signal generated by the manual control signal generator 49 is substantially unaffected by the diodes 100 and 102.

Figure 3:
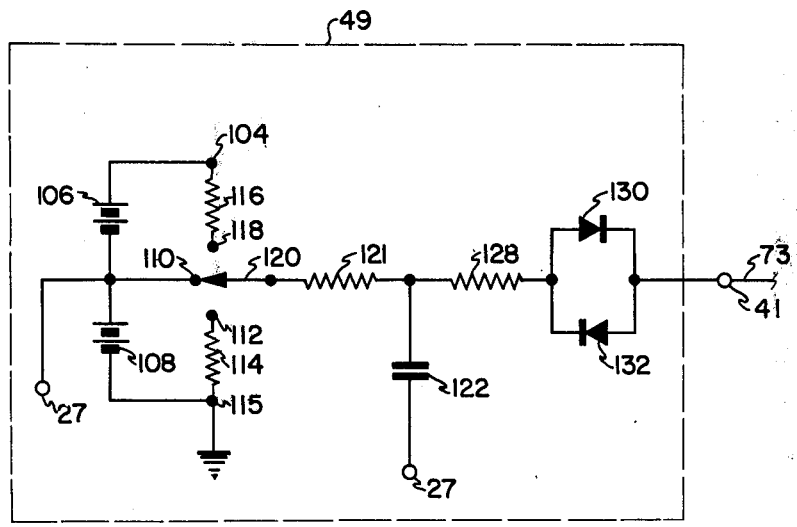
FIG. 3 is another embodiment of the signal generator shown in FIG. 1.

FIG. 3 shows another embodiment of the manual control system generator 49 of FIG. 1. A source terminal 104 is connected to a positive terminal of a battery for energy source 106. The negative terminal of the battery 106 is connected to the common terminal 27. A battery 108 has its positive terminal connected to the common terminal 27 which, in the present example, is held at a 3 volt level as herein explained. The negative terminal of the battery 108 is connected to another source terminal 115 which is connected to ground. The common terminal 27 is also connected to a switching terminal 110. Another switching terminal 112 is connected through a resistor 114 to the source terminal 115. The source terminal 104, in the present example is held at 6 volts, by the battery 106. The source terminal 104 is connected through a resistor 116 to a switching terminal 118. The source terminals 104 and 115 comprise a source terminal means. A control switching member 120 is selectively movable among the switching terminals 110, 112, and 118. The control switching member 120 is connected through a resistor 121 to one terminal of a capacitor 122. The other terminal of the capacitor 122 is connected to the common or reference terminal 27. The junction of the resistor 121 and the capacitor 122 is connected through a resistor 128 to the anode terminal of a diode 130. A cathode terminal of the diode 130 is connected by the lead 73 to the point 47, shown in FIG. 1. A diode 132 is connected across the diode 130, the cathode terminal of the diode 132 being connected to the anode terminal of the diode 130.

In operation, the circuit of FIG. 3 functions similarly to the circuit of FIG. 2. The control switching member 120 is normally engaging the switching terminal 110 which is connected to the common or reference terminal 27. Therefore, the capacitor 122 will become charged to the potential of the common terminal 27, which is 3 volts in the present example. If it is desired to decrease the magnitude of the output signal applied to the load 56, the control switching member 120 would be moved into engagement with the switching terminal 118. The capacitor 122 will then begin to charge through the resistors 121 and 116. The increasing potential across the capacitor 122 represents the manually generated control signal which is coupled through the resistor 128, diode 130, and lead 73, to the point 47 in FIG. 1. That control signal as hereinbefore explained, is applied to the amplifier 52 and the capacitor 51, thereby providing an output signal on the terminal 54, the rate of change of which is a function of the uninterrupted time period during which the control switching member 120 is in contact with the terminal 118. The magnitude of the output signal at the terminal 54 may also be increased by moving the control switching member 120 into contact with the switching terminal 112. The capacitor 122 will then begin to charge through the resistors 121 and 114. The charging of the capacitor 122 provides a negative control signal which effects a increase in the output signal at the terminal 54 of FIG. 1. The value of the resistor 121 is small vis-a-vis the value of resistors 114 and 116, in order to permit the rapid discharging of the capacitor 122 which is required during repetitive jogging operations.

Thus, there has been provided, in accordance with the present invention, a process controller having a substantially electronic manual control signal generator for providing a time varying control signal in the manual mode of operation of the process controller.

The embodiments of the invention in which an exclusive property or privilege is claimed are defined as follows:

1. Control signal generating means comprising:
   source terminal means arranged for connection to a voltage source;
   a selectively actuable switching means arranged to be selectively connected to said source terminal means; and
   responsive means connected to said selectively actuable switching means, said responsive means being responsive to an actuation of said switching means for providing an output signal, said responsive means further including means for characterizing the rate of change of said output signal as a function of the uninterrupted time during which said switching means remains actuated said source terminal means comprising first and second source terminals arranged for connection to first and second D.C. potentials, respectively, said switching means being selectively operable to engage one of said first and second source terminals, said responsive means further including a reference terminal arranged for connection to a D.C. potential intermediate said first and second D.C. potentials, said switching means being biased to engage said reference terminal in the absence of a selective connection to one of said first and second source terminals.

2. The combination as set forth in claim 1 wherein said switching means comprises first and second switching members, said first switching member being selectively movable from an unconnected position between said first and second source terminals into engagement with one of said first and second source terminals, said responsive means further including:
   an impedance means connected to said first switching member;
   a storage means connecting said impedance means with said reference terminal;
   first and second switching terminals;
   an integrating means;
   means connecting said first switching terminal with said integrating means; and
   means connecting said second switching terminal to said reference terminal, said first and second switching members being ganged for simultaneous operation, said second switching member being connected to the junction between said impedance means and said storage means, said second switching member being arranged to contact said second switching terminal whenever said first switching member is in said unconnected position,
   said second switching member being responsive to a selective movement of said first switching member from said unconnected position into engagement with one of said first and second source terminals for contacting said first switching terminal.

3. The combination as set forth in claim 1 wherein said switching means comprises a single switching member, said responsive means further including:
   first, second, and third switching terminals;
   first impedance means connecting said first source terminal with said first switching terminal;
   second impedance means connecting said second source terminal with said second switching terminal, said reference terminal being connected to said third switching terminal, said control switching member being biased into engagement with said third switching terminal and selectively operable to engage one of said first and second switching terminals;
   third impedance means connected to said control switching member;
   storage means connected between said third impedance means and said reference terminal;
   integrating means; and
   means connecting the junction of said third impedance means and said storage means to said integrating means.

* * * * *